United States Patent [19]
Friedman

[11] Patent Number: 4,804,230
[45] Date of Patent: Feb. 14, 1989

[54] INFANT CARRIER

[76] Inventor: Donald Friedman, 4448 Via Esperanza, Santa Barbara, Calif. 93110

[21] Appl. No.: 57,901

[22] Filed: Jun. 2, 1987

Related U.S. Application Data

[63] Continuation-in-part of Ser. No. 702,953, Feb. 19, 1985.

[51] Int. Cl.$^4$ ............................................. A47C 7/02
[52] U.S. Cl. ................................. 297/457; 297/216; 297/250
[58] Field of Search ............... 297/457, 488, 250, 216; 5/94, 118

[56] References Cited

U.S. PATENT DOCUMENTS

| | | | |
|---|---|---|---|
| 3,097,016 | 7/1963 | Bigler, Jr. | 597/250 X |
| 3,460,791 | 8/1969 | Judd | 297/216 |
| 3,645,548 | 2/1972 | Briner | 297/216 |
| 3,724,603 | 4/1973 | Shiomi et al. | 297/216 X |
| 3,802,737 | 4/1974 | Mertens | 297/216 |
| 3,957,303 | 5/1976 | Mauron | 297/216 |
| 4,113,306 | 9/1978 | von Wimmersperg | 297/216 |
| 4,186,961 | 2/1980 | Farrell, Jr. | 297/216 |
| 4,501,032 | 2/1985 | Heath et al. | 297/216 X |

FOREIGN PATENT DOCUMENTS

| | | | |
|---|---|---|---|
| 1966727 | 10/1973 | Fed. Rep. of Germany | 297/216 |
| 2707323 | 8/1978 | Fed. Rep. of Germany | 297/216 |

Primary Examiner—Peter A. Aschenbrenner
Attorney, Agent, or Firm—Christie, Parker & Hale

[57] ABSTRACT

An infant carrier has a bed inclined in a shell. During a collision, the bed moves in response to inertial load of an infant to a more upright position to react the inertial load uniformly along the infant's head and spine. During this movement, the bed and shell permanently deform and absorb kinetic energy of the infant.

9 Claims, 6 Drawing Sheets

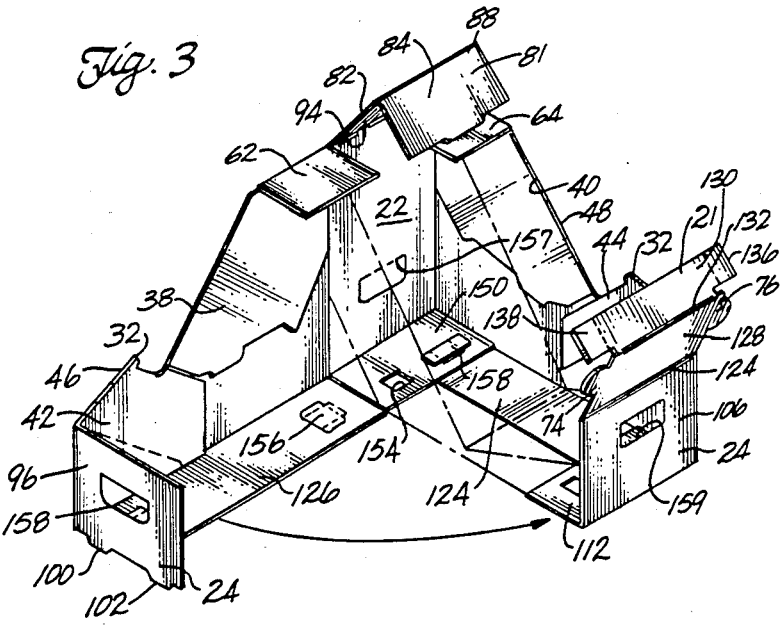
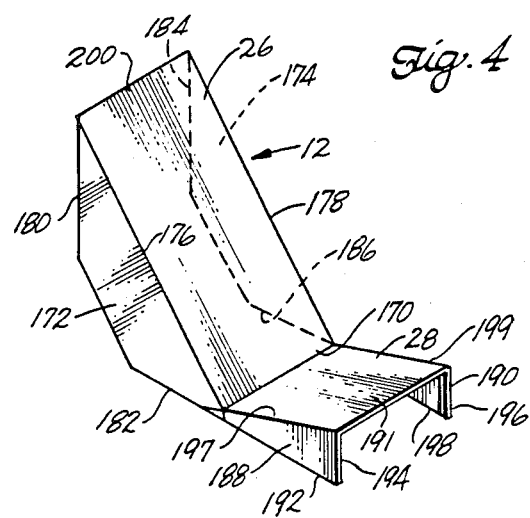

INFANT CARRIER

CROSS-REFERENCE TO RELATED APPLICATION

This is a continuation-in-part application of U.S. application Ser. No. 702,953, filed Feb. 19, 1985.

BACKGROUND OF THE INVENTION

The present invention relates in general to infant seats used in vehicles, and, more in particular, to an infant carrier that during a collision both absorbs kinetic energy of the infant and keeps an infant within the carrier by deforming while the infant moves from an inclined position to an upright position. The carrier forms by folding its components together.

Taking a newly born infant home from the hospital in the family car is a wonderful experience. Not unusually, the mother sits in the front seat and cradles the infant in her arms. Though soothing to both the mother and infant, this method of transport is very perilous. With the rapid deceleration of a panic stop or front-end collision, the infant's inertia can cause the infant to be torn from the mother's arms and thrust against the dashboard or windshield with tragic results.

Infant carriers for use in automobiles have evolved from merely things for convenient transport to seats offering the larger infant protection in the event of an accident.

The safer infant carriers have an inclined bed to support the infant with the infant facing to the rear of the vehicle. The infant is restrained to the bed by a belt harness. The bed provides substantial support along the entire head and back of an infant to resist inertial loads of the infant resulting from collisions at the front of the vehicle. These carriers are held in place by a lap belt. There are a number of outstanding such seats, but they have notable problems. First, they do not absorb enough of the kinetic energy of the newborn infant during an accident, resulting in high decelerating forces on the infant. Second, they are expensive and cannot readily be provided by a hospital. Third, an infant can slide back out of them during rapid deceleration unless an easily misused belt-harness system is properly fastened. Fourth, they cannot be tailored to the size and mass of the infant, which changes dramatically in the first six months of life. And, they must be especially padded with energy absorbing material in the area of the infant's head to cushion the head.

The kinetic energy of the infant must be absorbed during the deceleration. A padded but rigid carrier forces this energy to be absorbed largely by the infant. Available seats produce newborn infant head and chest accelerations in the life threatening limit in standardized 30 mph Government tests.

Unfortunately, even these carriers are often not available at the time that the infant leaves the hospital on the trip home. If a safe and inexpensive carrier were available, it could be provided by the hospital, and the incidence of tragic injury reduced.

Infants, particularly newborns, have soft bone structure making the attachment of restraining belts difficult and cumbersome. Misuse can result in the infant moving out of the safety of the carrier.

An infant grows rapidly in its first few months of life. A safe carrier should be designed so that the carrier crushes, and therefore, optimally protects the infant as it grows from five to twenty pounds.

Infant carriers in the form of traveling cribs made of cardboard and folded together by their user have been proposed. U.S. Pat. No. 3,487,479 to Grooms discloses one example. The Grooms crib provides no crash protection. Infant carriers have absorbed some of the kinetic energy of a crash with energy absorbing material. U.S. Pat. No. 4,067,608 to Von Wimmersperg is an example. While the Von Wimmersperg construction absorbs energy, it does not react inertial loads as much as possible with the infant's body in preference to the head, and does not take advantage of permanent deformation as an energy absorbing agency. U.S. Pat. No. 4,501,032 to Heath shows a bassinet that rotates a bed from horizontal to inclined at a predetermined acceleration. But Heath does not effectively load the body preferentially, absorb energy or use permanent deformation as the energy absorbing agency. None of these devices minimize acceleration on vital body parts.

SUMMARY OF THE INVENTION

The infant carrier of this invention has a bed in a shell for use in a vehicle. In a crash, the bed rotates in the shell because of the inertia of the infant and because of orientation devices towards a plane normal to the acceleration vector. While the bed rotates, the carrier absorbs kinetic energy of the infant by permanently deforming material of the bed, the orientation device, and the shell. In one embodiment, the carrier has a bed for the infant, with crushable projections, such as wings, that orient the bed in a shell between it and the shell, the shell being secured to the vehicle by a seat belt. When the vehicle decelerates, the bed and the infant move under the infant's inertial load in the direction of the deceleration and rotate within the shell towards a vertical plane, the plane normal to the acceleration vector. While this is going on, the bed, the deflection device, and the shell crush permanently and absorb kinetic energy. The crushing force and deflection properties of the bed wings constrains this movement and directs it. The bed, wings, and shell, therefore, limit the forces on the infant by absorbing kinetic energy.

The preferred embodiment for the growing infant consists of a bed with a back that inclines at an acute angle to the horizontal in a shell to facie, towards the rear of a vehicle and in a standard orientation. However, under the inertial load of an infant from rapid deceleration, the back rotates to close the angle of inclination towards the vertical and to take inertial loads through the body as much as possible.

In a specific form, the infant carrier of this invention has a bed in a shell. The bed can move in the shell to limit the inertial loads on the infant by crushing the material of the bed, orientation devices between the bed and shell, and distorting the shell. The bed has a back that inclines at an acute angle to the horizontal in the shell in a standard orientation. However, under the inertial load of an infant from rapid deceleration, the back rotates to close the angle of inclination towards the vertical and to take inertial loads of the infant along the infant's body as much as possible. This happens while the carrier deforms and absorbs kinetic energy of the infant, preferably by crushing energy absorbing material of the carrier. The energy absorption can be in both the bed and the shell through their permanent deformation. Preferably the shell provides a barrier all around the bed to keep an infant in the shell and to orient the bed. It is also preferred to provide energy absorption by failure of the means that support the back in its inclined position. These means may include wings attached to the back at its top that orient the back and bear on the back of the shell. It is also preferred to leave the lower portion of the back unsupported and freer to rotate towards a vertical position than the supported upper portion of the back; the back can also have a local zone of weakness to facilitate this preferential movement of the lower portion of the back.

The carrier is preferably made of plasticized cardboard. The bed and shell force-deflection characteristic can be adjusted by the cardboard corrugation orientation. The bed is designed with a force-deflection characteristic appropriate to safely decelerate the mass of the infant as it grows.

The force-deflection characteristics of the carrier should vary with the mass of an infant: the bed should deflect more readily for a small infant than for a large infant. This requirement can be met with a single shell and a replaceable bed. To fit into a comparatively large shell, a bed for a small infant of up to, say, 10 pounds, may have marginal upstanding channels that adapt the bed to the shell. The shell can also accept a second bed without the channels for a larger infant of from say, 10 to 20 pounds. This permits the carrier to be optimized to compensate for growth of an infant merely by changing beds.

The present invention also provides a preform of shell that is preferably made of an inexpensive material, such as cardboard, and that can be assembled from flat pieces into a very safy conveyance just prior to use. In the limit it absorbs energy and limits acceleration.

Assembled, the infant carrier of the present invention has an outer shell that receives a bed. The shell provides barriers on all sides of the bed. A cowl over the foot of the bed has a catch that receives a lap belt of the vehicle to hold the infant carrier in place. A soft hood over the top of the bed provides a limiting motion the energy absorbing barrier there. The bed has wings that bear against the bottoms and front wall of the shell. The corrugations of the shell at the catch are generally in line with the acceleration vector so that the corrugations can absorb impact energy; the corrugations of the bed and its wings are oriented to absorb impact energy by crushing.

Preferably, during a crash the bed absorbs the kinetic energy of the infant by the bed crushing in resistance to the infant with the bed preferentially crushing in the middle along the spine of the infant to fold into intimate contact with the infant. The shell, too, deforms when the bed engages it to hold absorbed energy. During deceleration, the bed wings collapse to absorb energy. The bed also becomes more and more erect as deceleration goes from start to completion because the bed wings provide more resistance at the top of the bed. The requisite energy absorption may be aided by accordion folds in the wings of the bed at the top of the bed that interact with the shell during impact to resist crushing longer than the lower back of the bed so that the infant swings as a unit from an inclined position to a more erect position. The lower portion of the bed back that supports the infant body also crushes and absorbs energy; the shell can also crush and absorb energy. In this manner, the infant stays within the confines of the shell while its kinetic energy is significantly absorbed by the crushing. The catch panel and the catch of the shell can also deform and absorb energy.

Preferably, the preform infant carrier includes a shell preform that has a back panel, a right side attached to the back panel and a left side attached to the back panel, and at least one front panel attached to one of the sides. The sides attach to the back panel for folding along lines from a generally flat preform orientation. Similarly, the front panel attaches to the sides for folding from a generally flat preform orientation. The sides, back panel, and front panel fold into a rectangular parallelipiped shell, as viewed in plan. Bottom flaps attach to at least some of the sides, front panel, and rear panel for folding along lines to close the bottom of the shell in an assembled orientation. Means, such as interlocking tabs and slots of the bottom flap, or preglued tabs, secure the flaps together and hold the shell in its rectangular parallelipiped shape against closure as by racking. Preformed panels form a cowl at the front of the carrier, one of the panels attaches to the front panel for folding inwardly towards the back panel and another of the panels attaches to the first to fold downwardly towards the bottom of the shell. Means attach these sections to the side in the assembled shell. The downwardly extending cowl panel forms a catch for a lap belt of a vehicle to hold the carrier firmly in place against a seat of the vehicle. A hood formed of a compound flap attached to the back panel folds over a line of attachment towards the front of the carrier, a portion of this compound hood flap folds back on itself towards the rear panel, and, in preferred form, meets the rear panel. Wings of the sides attach to the balance of the sides along fold lines to fold against the inside of the sides to form a wall of double thickness. Bearing edges of the wings engage the back panel in assembly. The wings can be compound to form posterior and anterior wing elements.

A bed has a back and a foot attached together along a fold line; the bed also has wings along its back to provide bearing edges to bear against the bottom flaps and the back wall and locate the back within the shell with portions of the side and the hood extending around it to form barriers that confine the infant to the bed. The foot also has support wings that fold for bearing against the bottom flaps and front wall, the foot extends in assembly into the space underneath the cowl. The bed wings do not extend into the lower back portion so that this portion caves in easier; this preference can be augmented by a zoned weakness in the back at the lower end of the wings.

Stated in different words, the shell is formed of a monolithic piece of material that stores flat. It has a back, right and left sides, and a front that fold together and lock together, as through tabs interlocked in slots. Preferably, the sides have anterior and posterior wings that fold over fold lines inside the shell and against the side panels to form sidewalls of double thickness. A compound crown flap folds frontwardly from the back wall and back onto itself over flaps of the side panels to form the hood of the shell. The bed bears against the crown flap to keep it closed and in firm frictional engagement with the side panel flaps. The front wall is preferably of double, overlapping panels that extend from fold lines from the side panels and close the front of the shell. The cowl includes panels that extend from a fold line above one of these front panels inwardly towards the back of the shell and then step downwardly towards the bottom of the shell, the downwardly extending portion providing the catch for the seat belt to engage. The cowl panels unite with the sides as by opposed ears that fit in slots between the side panels and anterior wings and lock the cowl in place. The bed has wings that bear against the bottom and front wall of the shell. Punched out grips in the front and rear panels make the carrier easy to carry. Each of the bed wings along the upper bed back extend from the back top to a terminus cut in the lower bed back that is spaced from the junction of the bed with the foot so that the base of the bed is weaker than the balance of the bed and deforms more readily. This preferential folding can be enhanced by a fold line at the junction of the upper bed back with the lower bed back.

This invention provides an inexpensive, safe carrier for infant automotive travel. The bed's movement from an inclined position to a more upright position distributes the inertial load of the infant along the body and keeps this load from loading the infant's head; it also keeps the infant in the carrier. The carrier may be of disposable material and can be stored flat so as not to take up much space when not in use. When needed, it readily folds together into a carrier that provides excellent support along an infant's head and back to resist the dynamic forces resulting from high deceleration forces produced by rapid stops or a collision. The bed and, in the limit, the shell absorbs kinetic energy of the infant by the crushing of selected portions in a manner that keeps the infant in the carrier.

These and other features, aspects and advantages of the present invention will become more apparent from the following description, appended claims, and drawings.

BRIEF DESCRIPTION OF THE FIGURES

FIG. 3 shows the shell being folded together;

FIG. 4 shows the bed of the carrier in perspective looking downwardly at the top from above and to one side of the bed;

DESCRIPTION OF THE PREFERRED EMBODIMENT

Figure 1:
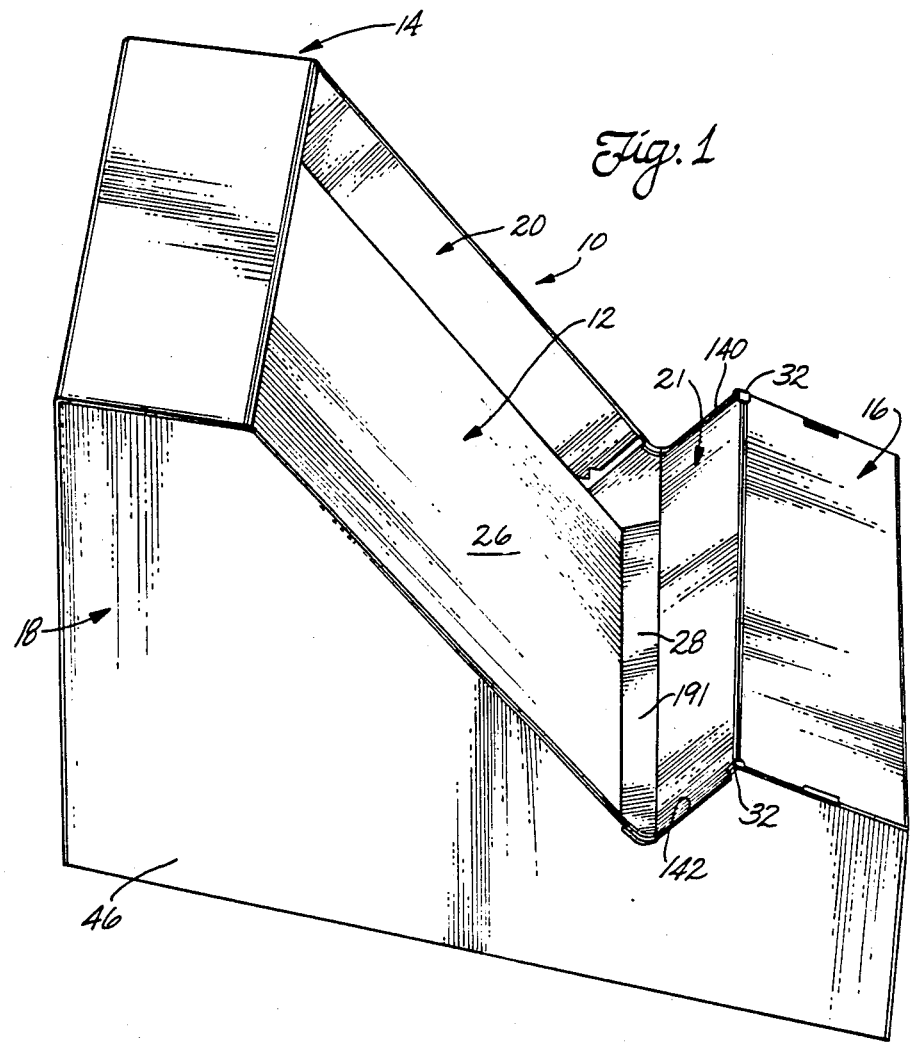
FIG. 1 is a perspective view of the infant carrier looking downwardly at the top and one side of the carrier.

In general and with reference to FIG. 1, the carrier is of two parts: a shell 10 and a bed 12 nested inside the shell. The shell has a hood 14, a cowl 16, and a pair of sidewalls 18 and 20. The cowl has a lap belt catch 21 to anchor the carrier through the lap belt to the seat of a vehicle. The bed, by being inset into the shell, is protected on all of its sides: by the hood at the top, the side walls on the sides, and by the cowl at the bottom. The bed is inclined in the shell to support an infant all along its head and back so that inertial loads will not cause harmful displacement of these critical body components. The catch locates the anchoring seat belt close to the junction of the vehicle's seat and back for good stability, but away from the infant.

With brief reference to FIG. 3, the shell further includes a back wall or panel 22 and a front wall 24 formed of two panels.

With reference to FIGS. 1 and 4, bed 12 includes a back 26 and a foot 28. The foot extends at an angle from the back into a space within the cowl. Portions of the side panels, the cowl, the back and the front panels border the foot. The foot, portions of the side panels, and the hood border the back.

Lap belt catch 21 of the cowl is a re-entrant step formed by a panel of the cowl. Projecting stops 32 of the side walls at the upper edge of the catch keep the lap belt in place.

Inexpensive material, such as corrugated cardboard, is the material of choice to make the carrier. Precut preforms of the shell and bed permit the carrier to be formed by folding.

Figure 2:
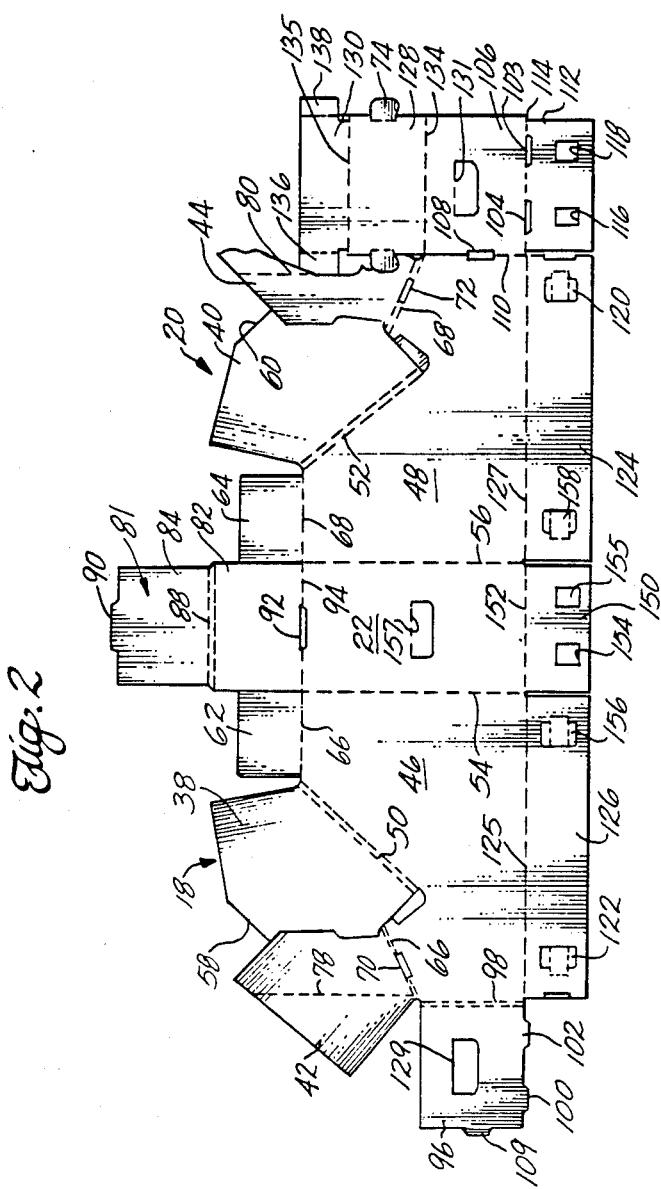
FIG. 2 shows the preform shell of the carrier flattened out into a plane, which may be its stored configuration.

With reference to FIG. 2, the precut preform of the shell is shown fully expanded. It is essentially two dimensional or planar, and as it would probably be stored (although it can readily be doubled over for storage as well). The shell preform has left side 18 and opposed right side 20. Each side includes a posterior wing, shown at 38 and 40 for sides 18 and 20, respectively. Sides 18 and 20 also have anterior wings 42 and 44, respectively. A pair of side panels 46 and 48 of sides 18 and 20, respectively, form the outer surfaces of the sides. The posterior and anterior wings fold 180° inside the side panels to form the sides as stiff double thickness walls. Wings 38 and 40 join side panels 46 and 48 along folding score lines 50 and 52, respectively, and fold along these lines. Side panels 46 and 48 join back panel 22 along folding score lines 54 and 56, respectively, for folding 90° toward the front of the carrier. Wings 38 and 40 have bearing edges 58 and 60, respectively; these edges fold against the junction of the side panels with the back panel to couple the wings to the back panel when compressive forces exist between the two. Flaps 62 and 64 extend above side panels 46 and 48, respectively, from respective score lines 66 and 68; these flaps fold over at 90° to the plane of the panels between a compound crown flap of hood 14 (to be described).

Anterior wings 42 and 44 join side panels 46 and 48 along folding score lines 66 and 68, respectively, and also fold 180° to define a double thickness for the side walls at the anterior end of the shell. Slots 70 and 72 along the score lines receive ears 74 and 76 respectively, of cowl 16 when the ears are bent 90° in the final assembly to anchor the cowl to the sides. A folding score line 78 of anterior wing 42 permits the forward portion of the wing to bend with respect to the normal plane of the wing during assembly and avoid hitting the front panel of the carrier. A corresponding score 80 for wing 44 serves the same function.

The compound crown flap 81 (FIGS. 2 and 3) of hood 14 (FIG. 1) is formed of first and second flaps 82 and 14, respectively, that join at a folding score line 88. Flap 84 folds over score 88 180° underneath flap 82 with flaps 62 and 64 of the sides sandwiched between them. A tab 90 at the free end of the flap 84 fits into a slot 92 at the base of flap 82. A score line 94 at this base permits the flap to fold over at 90° to the plane of back panel 22.

Front wall 24 (FIG. 3) is of two panels. An interior panel 96 is one of the panels. It connects to side panel 46 along score line 98 and folds 90° with respect to side panel 46 towards the opposite panel. Panel 96 has tabs 100 and 102, with tab 100 registering in slot 104 and tab 102 registering in slot 103 both slots being at the base of a complementary front panel 106. Panel 106 is the other panel that together with panel 96 forms the front wall. A slot 108 along a score line 110 between panel 106 and side panel 48 receives a tab 109 of panel 96 in final assembly. Panel 106 folds 90° along score line 110 to its position in the front wall.

A bottom flap 112 attaches to panel 106 at a score line 114, and in final assembly folds 90° with respect to panel 106 towards back panel 22 along this score line. Flap 112 has slots 116 and 118 that receive tabs 120 and 122 of a pair of bottom flaps 124 and 126, respectively, in final assembly. Flaps 124 and 126 depend from side panels 48 and 46, respectively, and each folds 90° from the plane of its associated panel toward the other in assembly. Score lines 125 and 127 provide the fold lines for bottom flaps 126 and 124, respectively. Slots 129 and 131 in panels 96 and 106, respectively, are congruent in assembly and provide a frontal hand grip.

Cowl 16 (FIG. 1) is of two panels 128 and 130 separated by a score line 135. Panel 128 joins panel 106 at a score line 134; panel 130 folds downwardly along line 135 towards the bottom of the carrier and folds along this line at an acute angle with respect to the plane of the front wall. Opposed flaps 136 and 138 extend from the side of panel 130. Flap 136 folds 90° to fit into a space between side panel 48 and anterior wing 44 at the lap belt catch, as indicated at 140 in FIG. 1. Similarly, flap 138 folds 90° to fit into a space between side panel 46 and anterior flap 42 at the lap belt catch, as indicated at 142 in FIG. 1.

A bottom flap 150 extends from a score line 152 from back panel 22 for folding 90° towards the front of the carrier. Bottom flap 150 has slots 154 and 155 for the receipt of tab 156 of flap 126 and tab 158 of flap 124, respectively. The interlocking of the bottom flaps together by assembly with the tabs in the slots keeps the shell developed and resists shell collapse as by racking the sides. The crown interlock with the side flaps and the cowl with the sides performs this function, too.

A slot 157 in panel 22 provides a rear hand grip for the carrier. Slots 129 and 131 register in assembly and provide a front hand grip for the carrier.

Bed 12 is seen to best effect in FIG. 4. It includes back 26 and foot 28. The foot joins the back at a score line 170 and folds with respect to the back along that line. Support wings 172 and 174 extend from the back at score lines 176 and 178, respectively; the wings bend downward from the back along these lines. Support wing 172 has a back bearing edge 180 that bears against back panel 22 proximate score line 125 in final assembly. It has a bottom bearing edge 182 that bears against bottom flap 126 proximate score line 54 between that flap and side wall 46. Similarly, support wing 174 has a back bearing edge 184 and a bottom bearing edge 186 to engage the back panel proximate score line 56 and bottom flap 124 proximate score line 127, respectively. During a collision, the bed crushes to absorb energy. The shell back does not directly support the bottom of the back 12 because wings 172 and 174 do not contact the shell back directly: there is a space between the wings and the shell back of the base of the bed back. The difference of support along the back of the bed produces during collision a deformation of the back that is greatest at the base of the back and least at the top of the back. The result is that during a collision an infant will rotate in the shell from an inclined position to more of a vertical position so that the infant will not slide along the bed and contact the crown flap receiving excessive load on the head. During a crash, kinetic energy of an infant will be absorbed by wings 172 and 174 and back 26 deforming. Preferably, the cardboard corrugations of the wings are at right angles to the plane of the back, which corresponds generally to the direction of the acceleration vector; this makes the wings stiffer and capable of dissipating more energy. The corrugations at catch 21 in side panels 46 and 48 are also at right angles to the plane of the lap belt and generally parallel to the acceleration vector.

The foot of bed 12 has anterior support wings 188 and 190 that depend from a platform 191. These wings, generally triangular in shape, have bottom bearing edges and front bearing edges. For wing 188, the bottom bearing edge is shown at 192 and the front bearing edge is shown at 194. And for wing 190 the front bearing edge is shown at 196 and the bottom bearing edge is shown at 198. Platform 191 supports the legs and rump of an infant. Anterior support wings 188 and 190 connect to the platform along score lines 197 and 199 and fold 90° downward along these lines.

A top edge 200 of bed 26 engages flap 84 of compound crown flap 81 and forces it into tight engagement with flaps 62 and 64 of sides 46 and 48. Thus the bed couples to the shell.

To assemble the carrier, the bottom flaps are bent along their score lines approximately 90° and towards the viewer in FIG. 2, as can be seen being developed in FIG. 3. Front panels 96 and 106 are bent 90° from side panels 46 and 48, respectively, towards the viewer in FIG. 2 such that they overlap each other in final assembly. The assembler folds wings 38 and 40 at their score lines 50 and 52 to lie flat against the inside of side panels 46 and 48, as can be seen in FIG. 3. The assembly continues with the anterior wings 42 and 44 likewise being folded inside the side panels, as can be seen in FIG. 3. Flaps 62 and 64 are folded forward in FIG. 2 so that they overlap each other in assembly and at about 90° to side panels 46 and 48. Compound flap 81 is bent at score line 94 forwardly in FIGS. 2 and 3 and at 88 rearwardly in these figures with flaps 62 and 64 ready to be sandwiched between them. The side panels are then proximated towards each other as indicated by the closing arrow in FIG. 3 so that the bottom flaps 112 and 150 overlie flaps 124 and 126. The tabs can then be fitted into the slots, as can be seen for tab 158, to interlock the bottom tabs. Ears 100 and 102 register with slots 104 and 103. Panel 96 lies inside of panel 106. The assembler folds flap 84 under flap 82 with flaps 62 and 64 sandwiched between them. Flap 128 is bent at its score line 124 rearwardly from panel 106 with ears 74 and 76 slipping into slots 70 and 72 respectively. Panel 130 is bent at score 135 with flaps 136 and 138 bent over for receipt in the slots developed at 140 and 142 (See FIG. 1).

As can be seen in FIG. 1, bed 12 is inset well within the opening in shell 10 to it; the back and foot of the bed are completely surrounded by structure: hood 14 bounds the top, sides 46 and 48 the sides, and cowl 16 the foot. Thus the carrier supports the infant along all sides. Back 26 angles away from the horizontal to present to an infant's head and back a continuous support to resist inertial loads resulting from panic stops or front end collisions. The back also crushes preferentially at its base because it is weakest there, the base being below and out of line from the bearing edges 180 and 184 of wings 172 and 174. Consequently, the back rotates from the inclined position to a vertical position during a crash and the infant passenger stays with the carrier. The lap belt catch conveniently anchors the carrier to a seat with the belt applying a righting moment to the carrier in opposition to an inertial moment applied to the carrier by the infant during stops and frontal impacts. Thus, the carrier is intrinsically safe.

Figure 5:
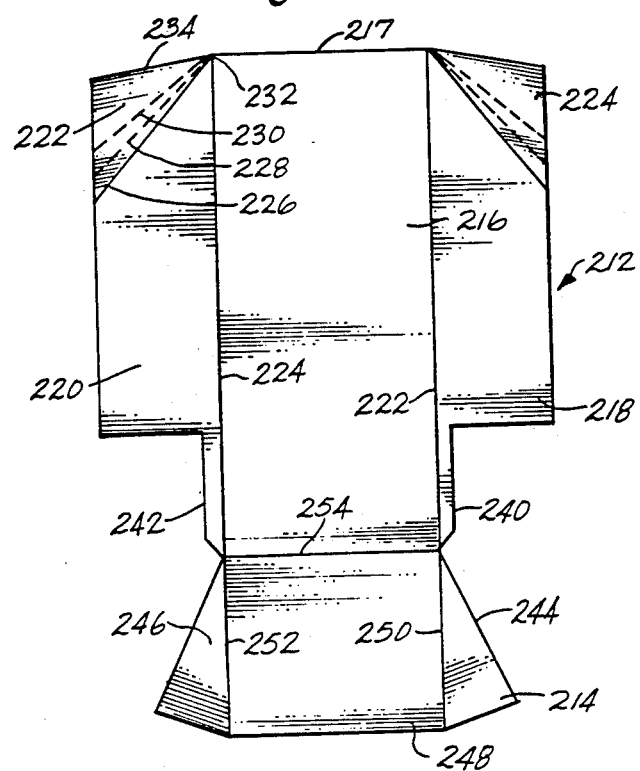
FIG. 5 is a plan view of the bed of an alternate embodiment that effects the absorption of kinetic energy in accordion folds at its top as well as along the back of the bed.
Figure 6:
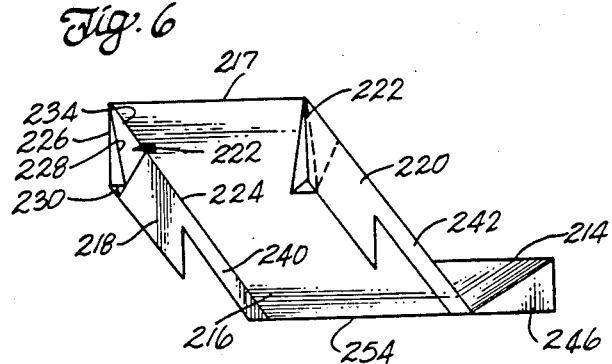
FIG. 6 is a perspective view looking at the rear of the bed of FIG. 5.

FIGS. 5 and 6 show an alternative form for the bed of the present invention. This alternate bed provides greater strength at its top to enhance the preferential crushing of the bed at its bottom during a collision so that an infant becomes more vertical as more and more crushing takes place. The bed does this by a fold that strengthens the top of the bed by coupling directly to the back of the bed so that as the portion of each support wing in engagement with the back of the shell crushes, the fold engages the shell back to make it more resistant to crushing.

In FIGS. 5 and 6 the modified bed is indicated as 212. It includes a foot 248 and a back 216. The back has a top 217. Support wings 218 and 220 extend from back 216 from score lines 222 and 224, respectively. As before, the wings fold at the score lines 90° to the plane of the back. Each of the wings has accordion folds at its top: wing 220 has accordion fold 222 and wing 218 has accordion fold 224. Fold 222 is typical. It is of a triangular shape and includes three fold lines 226, 228 and 230 in echelon pattern radiating from a common origin 232 located at the juncture of the back, wing and top of the bed. A bearing edge 234 of the fold also radiates from origin 232. Edge 234 engages the shell back and structurally couples the shell back and the top of bed back 216 together. In service, as seen in FIG. 6 the fold develops with edge 226 bearing against the back wall of the shell. Fold line 228 extends from origin 232 laterally inwardly from the plane of wing 218. Fold 230 extends from fold 228 laterally back towards the plane of wing 218. Edge 234 engages the underside of the upper portion of back 216 adjacent fold 224 between the back and the wing; with this coupling, the flap reinforces the upper portion of the back and the back's resistance to crushing is enhanced at the top of the back. The accordion fold enhances the upper bed back's strength by increasing the resistance to crushing at this location. Other techniques can be used to increase strength; for example, the accordion could be deleted and the flap configured so that it folds directly 180° to present edge 234 to fold line 224, although the resistance will not be as great.

In addition, the bed can be made preferentially weaker at the base of the back by reducing the depth at the wings there to provide less strength at the base of the back, such as by stepping at 240 and 242 for wings 21 and 220, respectively. In different words, the wings end a few inches from the bottom of the back.

The foot of bed 212 is much the same as the foot of the previously described bed. It includes support wings 244 and 246 that have edges for contacting the bottom and front of the shell. These wings depend from a platform 248 from fold lines 250 and 252. A fold line 254 transversing the bed separates the foot from the back.

Figure 7A:
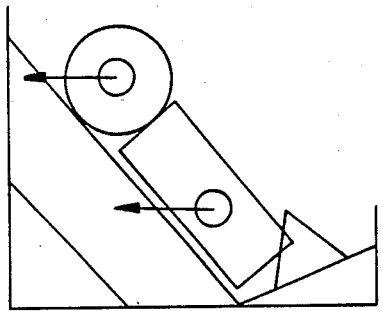
FIGS. 7A through 7D illustrate the dynamics of the infant and carrier during a crash.
Figure 7B:
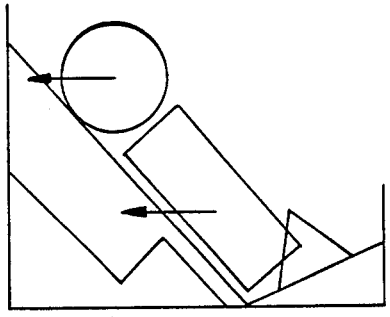
Figure 7C:
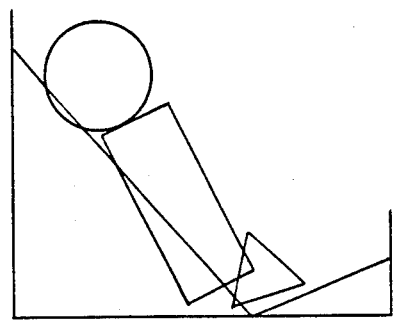
Figure 7D:
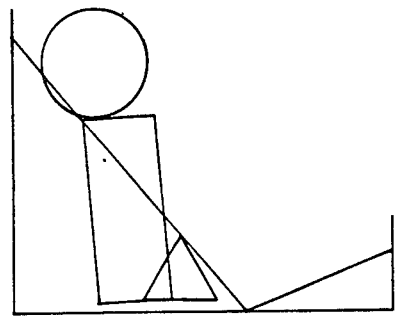

FIGS. 7A through 7D and 8A through 8C illustrate the dynamics of the carrier and an infant during a collision. FIGS. 7A and 7B show the two versions of the infant carrier with an infant at the start of rapid deceleration occasioned by an accident. In FIGS. 7A and 7B the inertia of an infant during deceleration tends to force the infant to the left of the figures against the bed of the infant carrier. The inertial loads of the infant's head and the body are shown separately and indicated by arrows. The infant's head loads the back of the bed and the back of the shell directly through the support wings' engagement with the shell back along a zone corresponding to the infant's head. The infant's body loads the bed, but the bed is not supported directly by the shell back because the wings do not engage the shell back in the zone of the body. In FIG. 7C, the result of this relative difference of resistance to the inertial loads of the infant is shown. The infant's body crushes the bed preferentially at the base of the bed. Because the head of the infant meets greater resistance at the top of the bed because of the engagement of the support wings with the back of the shell, the infant's head does not crush the bed as much. The infant rotates clockwise from a generally inclined position to a more erect position. In FIG. 7D the bed has been substantially completely crushed and the infant has taken a generally vertical attitude. The displacement of the head has been comparatively small compared with the displacement of the body. The infant, then, does not slide out of the carrier, but instead is captured by the carrier during the entire process of taking up the infant's inertia. In addition to this dynamic repositioning of the infant to keep it within the carrier, the carrier has absorbed some of the kinetic energy of the infant by the crushing of the bed. In the limit it may be expected that the shell itself will distort or deform to absorb energy as the child moves rearward.

Figure 8A:
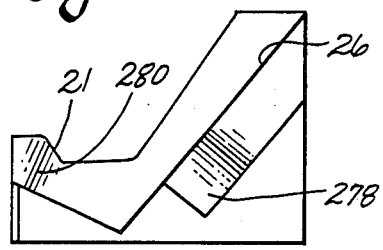
FIGS. 8A through 8C, similar to FIGS. 7, illustrate crash dynamics.
Figure 8B:
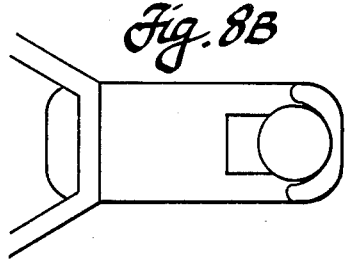
Figure 8C:
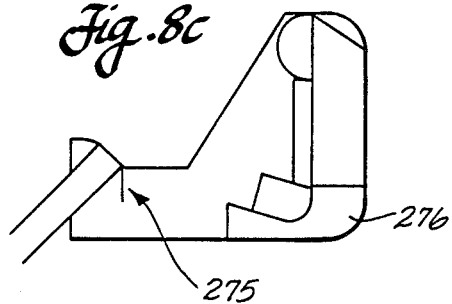

FIGS. 8A through 8C show much the same that FIGS. 7A through 7D do. FIG. 8A shows the carrier schematically before loading; FIGS. 8B and 8C show it after a crash. In FIG. 8B the infant after a crash is vertical in the bed. The bed and shell have deformed to conform to the infant by wrapping around the infant to form a concave inward pocket. The shell narrows slightly at the back to accommodate this deformation. The corners of the shell in plan have deformed from square to round. The lap belt has deformed the cowl, narrowing it and rounding its corners and absorbing inertial energy in the process. In FIG. 8C, the cowl is seen torn at 275, which absorbed some energy. The shell at its top and bottom has been rounded and the back of the shell bulged out. The bed in this elevation conforms to the shell, and bulges out, too. The extent that the back of the bed has been bulged is apparent from its base at 276; the base of the back has been pushed from flat into a rather deep pocket shape.

In simulated 30 mph crash tests with a 17 pound infant at 20 G's, the bed wings permanently deformed two inches and the bed and the shell two inches along the back for a total of four inches, the cowl pinched in about four inches for a total of eight inches of bed deformation over all. The seat belt stretch took about 50% of the inertial energy with the shell and bed taking the other 50%.

FIG. 8A shows the corrugation orientation. For the wing, corrugations 278 are at right angles to the plane of back 26, generally aligned with the acceleration vector. Corrugations 280 in the cowl at catch 21 are at right angles to the plane of the seat belt and generally parallel to the acceleration vector there (the pull of the seat belt on the carrier at the catch). The lightest infant to use the seat requires the bed to crush at very low force levels in order to limit the acceleration on its body, because the seatbelt has very little stretch at such low force levels.

Larger and heavier infants both stretch the seatbelt and will crush the low force level bed completely to the shell. A compromise is necessary in the acceleration levels experienced by the smallest infant if the same bed is to be used to contain the largest infant. In order to prevent a large infant from using a bed weak enough for the smallest infant the size of the bed must be adjusted to preclude its use by a large infant.

Figure 9:
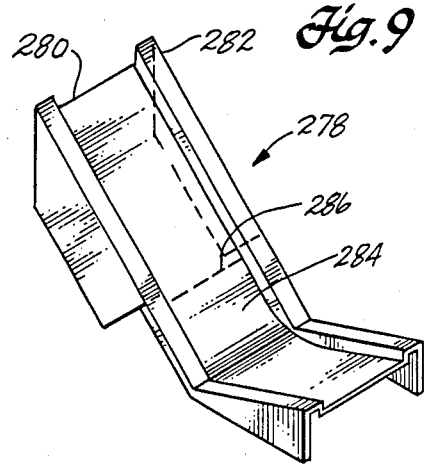
FIG. 9 is a perspective view of an alternate embodiment of the invention.

FIG. 9 shows a modified bed 278. It is the same as the bed of FIG. 6 except it has two lateral, raised channels 281 and 282, to either side of a bed 284 proper. This permits the bed to be used with a small infant in a shell large enough for a larger infant. The bed with a fairly large shell can be used with infants up to, say, ten pounds. For an infant between, say, ten and 20 pounds, a bed without the channels should be used, the one described in FIG. 6 being preferred. If two different beds are used the orientatin of the cardboard corrugations can be used to change the level of the forces. A zone of weakness 286 formed by a score line enhances the preferential collapse at the base of the bed from inertial loading by an infant.

The infant carrier of this invention can be used for a one way ride home from the hospital and discarded. It can also be used for a longer period, especially with the bed of FIG. 9. When used for a longer period, the cardboard can be coated with a protective coating.

The carrier is also easily assembled: a few folds along score lines, the insertion of a few ears and flaps into slots and the insertion of a few tabs into slots is all the assembler has to do. The carrier is inexpensive, and for this reason can be provided as a temporary carrier by institutions such as hospitals to protect the infant in his or her trip home from the hospital in a car.

The present invention has been described with reference to a preferred embodiment. The spirit and scope of the appended claims should not, however, necessarily be limited to this description.

What is claimed is:

1. An infant carrier for use in vehicles comprising:
   (a) a hollow shell adapted for placement on a seat of a vehicle, the shell having seatbelt catch means for engaging a seatbelt of the vehicle and anchoring the carrier with the seatbelt to the vehicle, the shell having walls that provide a barrier to keep an infant in the carrier during normal use of the carrier;
   (b) a bed inside the shell, the bed having a back for directly underlying and supporting an infant's head and back, the back having a top and a base, the bed being supported by the shell in a normal use position of the carrier with the bed back in an inclined position relative to the horizontal so that the bed back can underlie and directly support an infant's back and head with the head located towards the top of the back;
   (c) orientation and energy absorption means between the bed and the shell that permits the rotation of an infant from the inclined position to a position towards the vertical, the rotation being in response to inertia of an infant acting on the bed during rapid deceleration from a collision or panic stop, the orientation and energy absorption means absorbing and dissipating kinetic energy of an infant during such rapid deceleration by permanent deformation, such means including the bed back where it directly underlies and supports the back and head of an infant.

2. The infant carrier claimed in claim 1 wherein the orientation and energy absorption means includes the shell, the shell deforming by permanent deformation during the rapid deceleration to absorb and dissipate kinetic energy of an infant.

3. The infant carrier claimed in claim 2 wherein the orientation and energy absorption means includes wings between the bed back and the shell coupling the bed to the shell so that the bed back receives more support from the shell through the wings at the top of the back than at the base of the back and such that the bed back preferentially deforms at its base in response to inertia of an infant during the rapid deceleration.

4. the infant carrier claimed in claim 2 wherein the bed back has lateral sides between its top and base and the orientation and energy absorption means includes wings between the bed back and the shell, one of the wings extending along one of the lateral sides and one of the wings extending along the other lateral side, the wings engaging the back of the shell to help maintain the orientation and shape of the bed during normal use against the weight of an infant and being deformable during the rapid deceleration to absorb and dissipate kinetic energy of an infant, the wings extending along the bed back from its top towards its base but terminating a few inches from the lower end of such base so that the back below where the wings terminate deforms more in response to inertia of an infant during the rapid deceleration than where the wings extend along the lateral walls.

5. The infant carrier claimed in claim 4 wherein the bed back is flat and the shell and bed are made of cardboard having corrugations, the corrugations of the bed wings being generally at right angles to the plane of the bed back.

6. The infant carrier claimed in claim 5 wherein corrugations of the shell at the seatbelt catch means are generally at right angles to the plane of the seatbelt when engaged by the catch means.

7. The infant carrier claimed in claim 2 including a zone of weakness in the bed back, the zone of weakness producing permanent deformation of the back preferentially at the base of the back so that an infant supported by the base of the back rotates toward the vertical in response to inertia of an infant during the rapid deceleration more rapidly than the balance of the bed back.

8. The infant carrier claimed in claim 1 wherein the bed has a foot disposed at an angle to the bed back and horizontal and means between the foot and the shell to support the foot in the shell at an angle to the horizontal and the orientation and absorption means includes wings between the bed back and shell to maintain the orientation and shape of the bed back during normal use and to permanently deform during the rapid deceleration to absorb and dissipate kinetic energy of an infant.

9. The infant carrier claimed in claim 8 wherein the shell back is permanently deformable in response to inertia of an infant during the rapid deceleration to dissipate kinetic energy of an infant while producing a concave pocket around an infant during the rapid deceleration.

* * * * *